United States Patent Office.

J. BURROWS HYDE OF NEW YORK, N. Y.

Letters Patent No. 82,719, dated October 6, 1868.

---

IMPROVED MODE OF PRESERVING FRUITS, MEATS, VEGETABLES, AND OTHER PERISHABLE SUBSTANCES.

---

The Schedule referred to in these Letters Patent and making part of the same.

---

TO ALL WHOM IT MAY CONCERN:

Be it known that I, J. BURROWS HYDE, of the city, county, and State of New York, have invented new and useful Improvements in Preserving Certain Edible Matters from Decay; and I do hereby declare the following to be a full, clear, and exact description thereof.

The nature of my invention consists in preserving, animal, vegetable, and other edible matters from rapid decay, by packing them in, or by surrounding them with, dry pulverized peaty material, which I prepare by selecting pulpy peat, of proper quality, and drying and grinding it, and generally by also sifting it, to separate the fine or dusty portion from the coarser or granulated.

For most purposes, I prefer to exclude the finer grade, but in some cases I use the fine only, and in others I dispense with the sifting process, using the material as it comes from the mill.

Peaches, plums, grapes, and other delicate fruits, pears, apples, oranges, lemons, and edible vegetables, also dried figs, raisins, prunes, and other fruit in commercial packages, as well as fresh meats, poultry, game, butter, and fresh fish, should be packed so as to keep the articles or packages separate by the peat, by which they should be completely enveloped, and the entire mass made compact to prevent settling afterwards.

The peat being hygroscopic, and resisting the variations of temperature of the external air, which, moreover, cannot circulate through it even when the peaty matter is uniformly divided, desiccation is prevented, and the contents are kept cool and of uniform temperature.

Peat, furthermore, is highly antiseptic, and has the property to seize upon and hold gases arising from the decomposition of edible matters. This method of preserving is, therefore, not only adaptable for fruits, &c., intended for use or commercial sale, but it is particularly applicable to the store-rooms of ships and hotels. For this purpose it may be rendered still more convenient and efficient, by constructing such rooms double on all sides, as also top and bottom, with intervening spaces of two or more inches, which should be well packed with granulated peat. Railroad-cars designed for transporting meat, poultry, fish, as well as fruit, and also all refrigerators for family use, may be similarly constructed and filled, with like advantages.

I claim the material described for the purposes set forth.

J. BURROWS HYDE.

Witnesses:
   A. H. TAIT,
   THOS. W. MATHER.